United States Patent [19]

Heberle

[11] Patent Number: 5,237,322
[45] Date of Patent: Aug. 17, 1993

[54] MASTER-SLAVE DATA TRANSMISSION SYSTEM EMPLOYING A FLEXIBLE SINGLE-WIRE BUS

[75] Inventor: Klaus Heberle, Reute, Fed. Rep. of Germany

[73] Assignee: Deutsche ITT Industries GmbH, Freiburg, Fed. Rep. of Germany

[21] Appl. No.: 796,728

[22] Filed: Nov. 22, 1991

[30] Foreign Application Priority Data

Dec. 8, 1990 [EP] European Pat. Off. ........... 90123647

[51] Int. Cl.$^5$ ...................... G08C 15/08; H04J 3/06; H04L 7/00
[52] U.S. Cl. .............................. 340/870.130; 370/101; 375/107; 340/825.52
[58] Field of Search ...................... 340/825.52, 825.57, 340/825.07, 825.21, 825.2, 825.08, 825.53, 825.68, 870.11, 870.13, 825.63, 825.64, 870.14, 825.5; 370/85.2, 85.8, 92, 101; 375/107, 111; 395/425, 325

[56] References Cited

U.S. PATENT DOCUMENTS

| | | | |
|---|---|---|---|
| 3,735,355 | 5/1973 | Balogh, Jr. et al. | 395/425 |
| 4,050,062 | 9/1977 | Crocker et al. | 340/825.21 |
| 4,438,491 | 3/1984 | Constant | 364/200 |
| 4,611,274 | 9/1986 | Machiho et al. | 370/85.2 |
| 4,674,084 | 6/1987 | Suzuki et al. | 370/92 |
| 4,675,864 | 6/1987 | Bliek et al. | 370/85.8 |
| 4,707,829 | 11/1987 | Pendse | 340/825.07 |
| 4,894,648 | 1/1990 | Talbot | 340/825.07 |
| 4,956,852 | 9/1990 | Hodge | 340/825.07 |
| 4,975,907 | 12/1990 | Dutruel et al. | 370/85.2 |
| 5,095,480 | 3/1992 | Fenner | 340/825.52 |
| 5,165,023 | 11/1992 | Gifford | 395/325 |

FOREIGN PATENT DOCUMENTS

| | | |
|---|---|---|
| 0069509 | 6/1982 | European Pat. Off. . |
| 0217571 | 9/1986 | European Pat. Off. . |
| 0315158 | 11/1988 | European Pat. Off. . |

OTHER PUBLICATIONS

D$^2$-B-A Digital Data Bus for Small Area Networks; 8181 New Electronics; 17 (1984); Apr., No. 8; London, Great Britain.

Homenet: A Control Network for Consumer Applications; 8087 IEEE Transactions on Consumer Electronics; Vol. CE-29 (1983), Aug., No. 3, New York, USA.

*Primary Examiner*—Donald J. Yusko
*Assistant Examiner*—R. Gray
*Attorney, Agent, or Firm*—Thomas L. Peterson

[57] ABSTRACT

A master-slave data transmission system employs a flexible single-wire bus and where any master unit can send data to or read data from any slave at a single time. Data transfer is accomplished by means of a flexible message format having a variable-length address section and a variable-length data section, with the beginning and end of the individual message sections being defined by labels, and a fixed bit clock being transmitted for a given interval before and/or after the message. During multiple master operation, a priority control arrangement prevents two or more masters from accessing the single-wire bus at the same time.

19 Claims, 4 Drawing Sheets

MASTER-SLAVE DATA TRANSMISSION SYSTEM EMPLOYING A FLEXIBLE SINGLE-WIRE BUS

FIELD OF THE INVENTION

The present invention related to a data transmission system, and more particularly to a master-slave data transmission system including a master control unit which sends data to, or reads data from, a slave unit via an input/output module. The data transfer is implemented over a single-wire bus by means of a message containing the following sections: an address part defining the data sink or data source in the slave, a data part containing either the transmitted data or the read data, and start and end information.

BACKGROUND OF THE INVENTION

Master-slave data transmission systems employing a single-wire bus are known in the prior art and include control systems having a single data channel. See, for example, European Patent Application Number 0315158, filed on Nov. 2, 1988 and published May 10, 1989 in Bulletin 89/19, entitled METHOD AND APPARATUS FOR CONTROLLING TERMINALS ON A COMMUNICATION NETWORK by Ueno, Reiko and assigned to Matsushita Electric Co., U.S.. Pat. No. 4,438,491 issued Mar. 20, 1984, entitled COMPUTER HAVING PLURAL IC CHIPS WITH EACH CHIP INCLUDING A TRANSCEIVER by J. N. Constant, an article entitled HOMENET: A CONTROL NETWORK FOR CONSUMER APPLICATIONS, IEEE Transactions on Consumer Electronics, Vol. CE-29 (1983), No. 3 (297-304) by F. W. Gutzwiller et al. and article entitled A DIGITAL DATA BUS FOR SMALL AREA NETWORKS by T. Danbury, New Electronics, Apr., 1984 pp. 27-33. These materials show various data transmission systems and many of which employ two wire techniques for operation and are of general interest to the present system. See EPA 0217571 entitled DATA TRANSFER COMMUNICATION SYSTEM, filed Sep. 10, 1986 by R. D. Crawford et al. and assigned to Ford Motor Company, EPA 0069509 filed Jun. 23, 1982, entitled A CIRCUIT FOR READING OUT ADDRESS DATA APPLIED TO A MEMORY IN A ONE-CHIP MICROCOMPUTER by S. Masaki. These patents show a plurality of terminals of a communication network connected to a transmission line to communicate mutually. Each terminal includes a single device or multiple devices. There is an address assigned to each terminal with each terminal having a device address, a subdevice address assigned to respective devices constituting each terminal and having a single or a plurality of values, and a function address assigned to respective functions possessed by each device, whereby when a terminal to be controlled is a multiple device, only a desired function is controlled. If two or more masters and/or two or more slaves are present, collision-free control of the single-wire bus requires a complex control circuit. The cost of such a control circuit is warranted only if additional bus and control lines must be avoided because of the distance. Progress in integrated circuit technology, particularly in monolithic integrated circuit technology, makes it possible to provide system components previously implemented as passive devices with "electronic intelligence". This offers great advantages in data transmission systems where distance is not particularly critical.

It is an object of the present invention to provide a master-slave data transmission system operating with a single-wire bus which permits multiple-master and slave operation using a data format that can be simply adapted to the respective transmission and operational requirements.

SUMMARY OF THE INVENTION

The flexibility of the master-slave data transmission system of this invention enables individual elements of the data format to vary from message to message both in number and content.

The data format provides a freely selectable address length which enables rapid access to important data via an abbreviated address.

The master-slave transmission system can be used in the automotive field where master processors are able to read data from spatially separated sensors serving as slave units.

Since one single-wire bus to which all elements are connected is employed, the number of terminals of the respective units is reduced. Thus, because of the lower number of leads and interconnection lines, there is less chance of connection problems including failure due to open circuits or contact problems.

The freely selectable address length also facilitates replacements or retrofitting operations. In this manner, additional new functions which have to be implemented as new options via longer addresses, do not conflict with existing functions, because the latter still are used and implemented via the shorter addresses.

BRIEF DESCRIPTION OF THE FIGURES

The invention and its advantages will now be explained in more detail with reference to the accompanying drawings, in which.

DETAILED DESCRIPTION OF THE FIGURES

Figure 1:
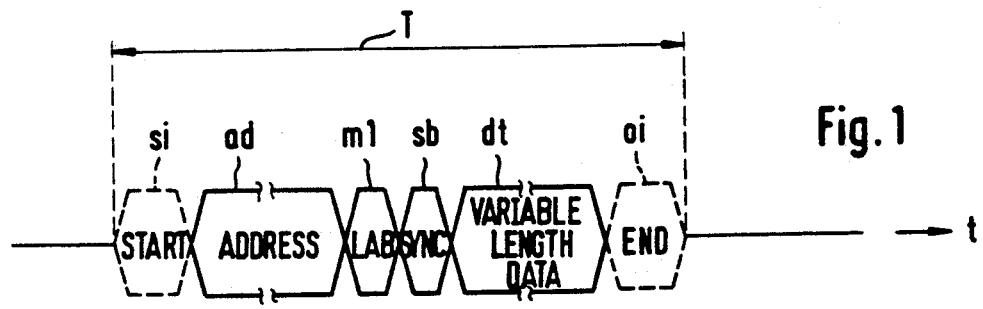
FIG. 1 is a timing diagram depicting a message format employed on a single-wire bus, according to this invention.
Figure 3:
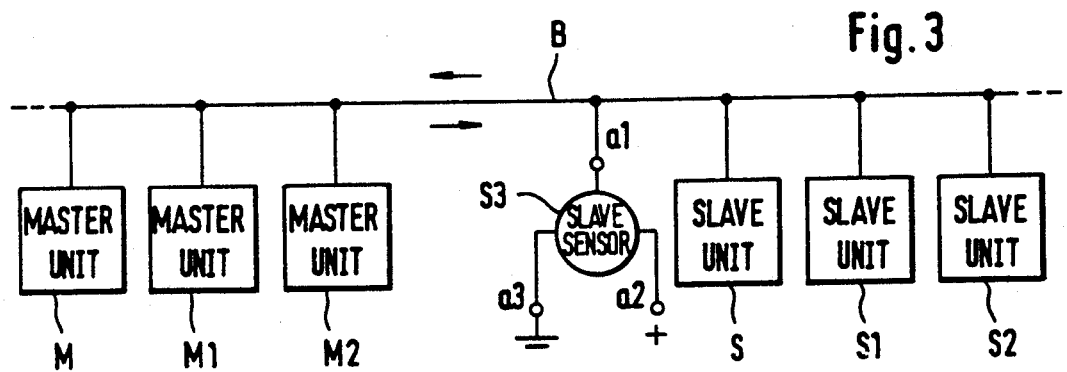
FIG. 3 is a block diagram of three masters and four slaves coupled together via a single-wire bus, according to this invention.
Figure 4:
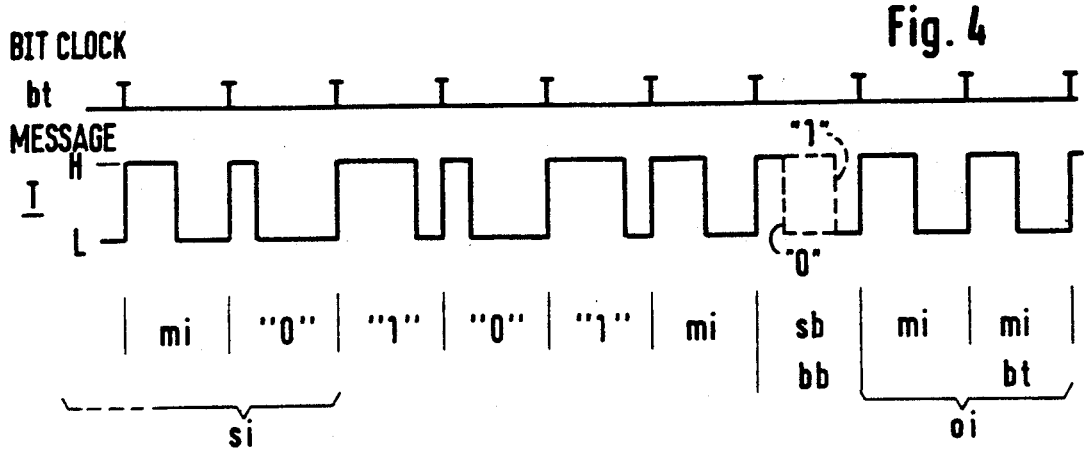
FIG. 4 shows first and second timing diagrams, a portion of a message format present during a given bit clock period.

Referring to FIG. 1, a message format T begins with a start information data or signal si. The start information si is followed by a variable-length address section ad, a first label m1, a synchronizing bit section sb, a variable-length data containing section dt, and an end information section or portion oi. The format T is transmitted and received on a single-wire bus B as shown in FIG. 3. Before and after the message, the single-wire bus B is in a first, quiescent or wait state. As seen in FIG. 4 in the quiescent state, the single-wire bus can be in a high-impedance condition or at a high (H) or low (L) switching potential. The message or data format T is proceeded by and followed by a bit clock bt. The clock bt (FIG. 2) is transmitted on the single-wire bus and can be employed as a wait signal. In this event, the transmission of specific bits for the start and end information portions si and oi can be dispensed with. In employing the bit clock to define the wait period, the start information s is defined by the last bit clock period, and the end information oi by two successive bit clock periods. The first label m1 and the synchronizing bit sb, are each one bit clock period long. FIG. 4 shows how the individual signals are provided and defined by different mark-space ratios.

Figure 2:
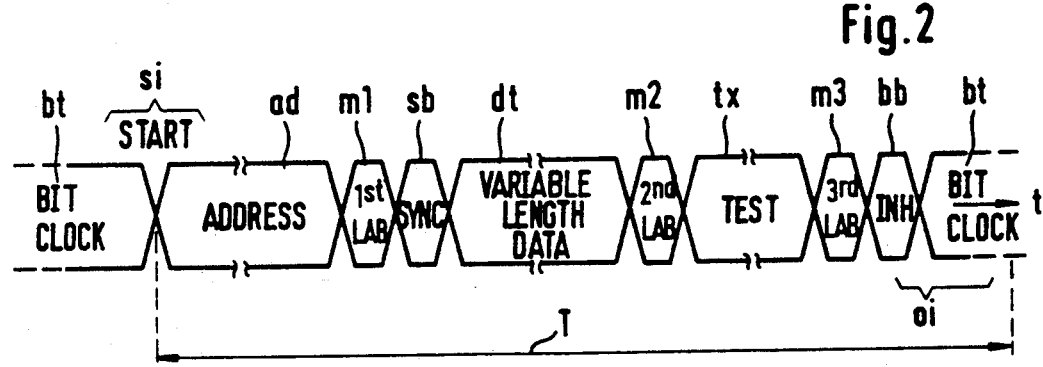
FIG. 2 is a timing diagram depicting an extended message format.

FIG. 2 is a timing diagram of a complex message format T which further includes all pertinent portions of the message format of FIG. 1. In the quiescent or wait state and before and after the message format T, the master unit constantly transmits the bit clock bt over the single-wire bus. The end of the bit clock bt and the beginning of the data of the address section ad form the start information section si. The address section ad is again followed by the first label m1, the synchronizing bit sb, and the variable-length data section dt. As compared to the format of FIG. 1, where the data section dt is followed by the end information oi, in FIG. 2 a second label m2 indicates that the message T is not yet complete. The second label m2 is followed by a variable-length test section tx, a third label m3, an inhibit bit bb, and the end information oi. The test section tx serves to test the address section ad and/or the data section dt. When an error is detected, the logic state of the inhibit bit bb is changed, where the entire transmitted message T is then canceled.

The address section ad, as in the format of FIG. 1, may be divided into a device address section da, an internal address section ia, and an operation address section oa. The device address da serves to address different slaves. The internal address ia is employed to access different data sources or data sinks within a slave unit. The operation address oa specifies the operation to be performed by the slave. If the slave is a read/write memory, for example, this memory can be accessed for the read or write mode by means of the specific operation address section oa.

The synchronizing bit sb serves to indicate to the master unit that the slave unit is not ready to receive the message T. The master then relinquishes the single-wire bus by transmitting the end information data signal oi, and transmits the message T once again after a specified wait time.

If two or more masters are connected to the single-wire bus, detection of the start information si by one master informs that master to cease the message T transmission until the end information signal oi appears on the single-wire bus. If two or more masters begin transmitting messages T simultaneously, those masters which detect a difference between the transmitted bit and the received bit by means of an output error detector module af (FIG. 5) will relinquish the bus one after the other or in sequence. Since the single-wire bus is implemented as a "wired OR" function, this operation can be implemented. One of the two bus states, usually the L state, can be forced on the bus by a single master or a single slave. In a similar manner, the logic states of the synchronizing bit sb and the inhibit bit bb are changed within the respective bit period. Bus control is thus accomplished in a simple manner by the output error detector af to be described.

The "wired OR" and the high-impedance state (third state of tri-state logic) may also be combined in the system logic. In this manner all master units and all slave units are in the high-impedance state except for the active ones.

When an active master unit, after transmitting the message T, transmits the bit clock bt in the wait state, the master unit impresses the bit clock generated within the unit on all other masters and slaves until a new master unit takes over by transmitting the start information signal si. The mark-space ratio of the bit clock bt during the wait state depends on the manner in which detection of the first address bit is accomplished. It may be necessary to insert a logic "0" or "1" or a label as start information si before the first address bit.

FIG. 3 shows three masters M, M1, M2 and four slaves S, S1, S2, S3 connected to the single-wire bus B. Any master unit can send data to or read data from any slave unit at a time on a serial basis. The individual slaves have different device addresses da. If data is to be exchanged between the masters then each master has a separate device address as does each slave. A slave S3 is shown as a three-lead device or component, two of the leads (a2, a3) being supply-voltage leads and the third lead (a1) being connected to the single-wire bus B. Such a component may be an electronic temperature sensor or the sensor S3 may be pressure transducer or sensor or any other suitable device whose digitized temperature value is read via the single-wire bus. Similarly, sensor devices S, S1 and S2 may be multiple terminal or two terminal devices, such as heat detectors, security switches as used in intrusion detection systems and so on.

FIG. 4 shows schematically the signal waveform of a portion of a message T aligned and associated with the bit clock bt. Only the clock periods of the bit clock bt have been marked, since the signal waveform, the mark-space ratio of the signal waveform T, is arbitrary as depending upon the data transmitted.

Shown below the bit clock bt is the signal waveform of a given number of bit clock periods constituting a portion of the message format T. At the beginning of each bit clock period, an L-to-H transition occurs. The negative edge occurs at predetermined times during the bit clock period and defines H and L states of different lengths. A first mark-space ratio which is less than unity defines a logic "0", and a second mark-space ratio which is greater than unity defines a logic "1". Thus as seen in FIG. 4, a "0" has an H level for much less of the bit clock interval than the L level. A "1" has an H level for a greater interval than an L level during a clock bit interval. A third mark-space ratio defines the label mi (approximately equal H and L levels) and may also define the bit clock bt during the wait state.

The transition from the bit clock bt or from the labels mi to a data bit "0" or "1" marks the start information si. The end information oi is detected if at least two labels mi are transmitted in succession. The synchronizing bit sb and the inhibit bit bb are characterized by the fact that a first logic state, e.g., a "1", is transmitted by the master. If the slave is ready to process the message T, it maintains the logic state of the synchronizing bit sb or the inhibit bit bb.

If the slave is not ready to process the message T, it triggers a not-ready signal in the master M by changing the synchronizing bit to a second logic state, e.g., a "0". Similarly, upon detection of an error, the slave triggers a cancel signal in the master M by changing the inhibit bit bb to the second logic state, e.g., "0". In either case, the transmitted message is ineffective, so that it will have to be repeated at a later time. This assignment applies to the "wired OR", in which a "0" prevails over the "1".

The necessary mark-space ratios are generated by an internal system clock cl or an auxiliary clock ht (FIG. 5 and FIG. 6) whose frequency is at least twice the frequency of the bit clock bt. The positive edges of the message T define the bit clock bt, to which all auxiliary-clock and clock generators in the slaves and those in the other masters lock or synchronize to with the aid of phase-locked loops. In any event, if phase locked loops are not employed and depending upon the data and clock rates, one could use extremely stable clock sources as crystals and so on and synchronize such sources by many different techniques.

Figure 5:
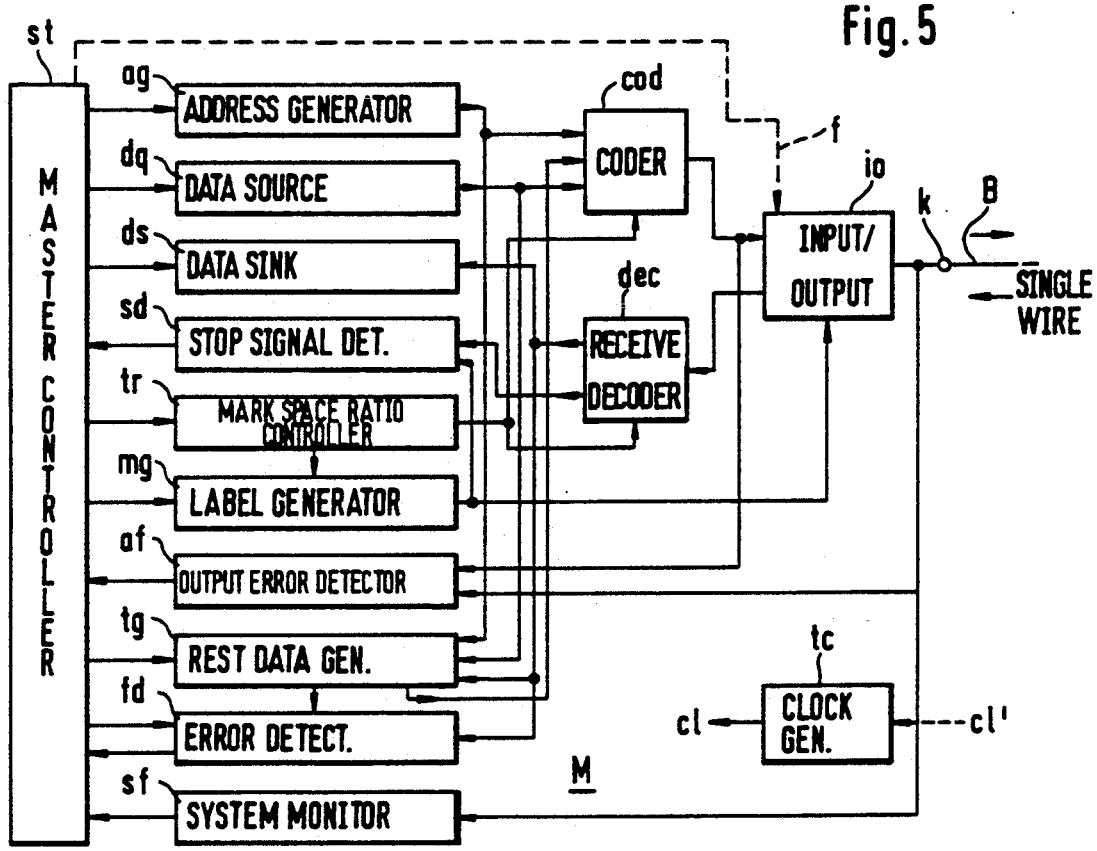
FIG. 5 is a block diagram of one embodiment of a master module or unit according to this invention.

FIG. 5 is a block diagram depicting the function of a typical master unit M. Many functional modules employed in the master unit M should be familiar to those skilled in the art. Thus a more detailed representation and description is unnecessary. Timing and control of the individual functional modules to be explained is accomplished by a master controller st, which receives control signals from the individual functional modules or sends control signals to the latter for activation. The master controller st includes a microprocessor which is programmed to implement many of the functions to be described and receives and transmits data and controls to the functional modules to be described.

An input/output stage or processor io has its output terminal k connected to the single-wire bus B and generates the individual H and L switching signals in the transmit mode. As shown in FIG. 4, the H and L levels are employed to implement given mark-space ratios which implementation can be provided in the I/O buffer or processor io. In the receive mode, the states of the single-wire bus B are sensed and transferred to a receive decoder dec. If a change of the input/output stage io to a high-impedance state is commanded by the master controller, a signal is sent on the control line f (dashed line). This signal causes the input/output io to change state. A coder cod operates for signals to be transmitted, and controls the mark-space ratio of the transmitted bits. The decoder dec decodes the received signals with respect to the mark-space ratio while the coder cod codes the transmitted signals to provide proper mark-space ratios. The corresponding windows are formed by a mark-space ratio controller tr, which is connected to the control inputs of the coder and decoder. Techniques for providing mark-space ratios corresponding to data levels are well known.

The mark-space ratio controller tr further controls a label generator mg. The generator mg provides the label mi (i=1, 2, 3) for the single-wire bus B via the input/output stage io. The serial input data for the coder cod is derived from an address generator ag, a data source dq or a test-data generator tg. The serial output data of the decoder dec is fed to a data sink ds, the test-data generator tg or a stop-signal detector sd, whose reference input is fed from the label generator mg.

The stop-signal detector sd operates to detect a substantial difference in the mark-space ratio between the two applied signals. Upon detection of such a difference the stop-signal sd signals to the master controller st to indicate the detection of a not-ready signal or a cancel signal. An error detector fd operates in a similar manner. One input of the error detector fd receives the output data from the test-data generator tg, and another input receives the output data from the decoder dec. The test-data generator tg forms the test data from the address data and/or the transmitted or received data. If similar processing of the data into test data takes place in the slave S, a transmission error will be detected by comparing the test data from the test-data generator tg with the received test data in the error detector fd.

Another detection of the not-ready and cancel signals is implemented by an output-error detector af. The first data input of the detector af is connected to the output of the coder cod, the second data input is connected to the output terminal k of the input/output stage io. A difference between the mark-space ratios at the two taps of the input/output stage io indicates that a slave S has changed the state of the synchronizing or inhibit bit sb, bb (FIG. 4).

A clock generator tc is shown in FIG. 5 as a separate module. The generator tc generates an internal system clock cl, and includes an internal phase-locked loop (not shown) which is coupled to the single-wire bus B or supplied with an external system clock cl'. During the wait state, the single-wire bus B is supplied with the bit clock bt from the label generator mg.

The presence of all functional modules in the master M is not necessary for reduced processing functions. For example, if data only has to be read, the data source dq is not needed. The test-data generator tg, which is needed in a slave unit, is not necessary in a master unit if the required data transmission reliability is low or attainable otherwise, e.g., by repetition. The processing of the data format of FIG. 1 does not require a test-data generator. A module sf monitors the single-wire bus and is connected between the bus and the master controller. In this way the master controller receives and can also process data on the bus B via the system monitor module sf.

Figure 6:
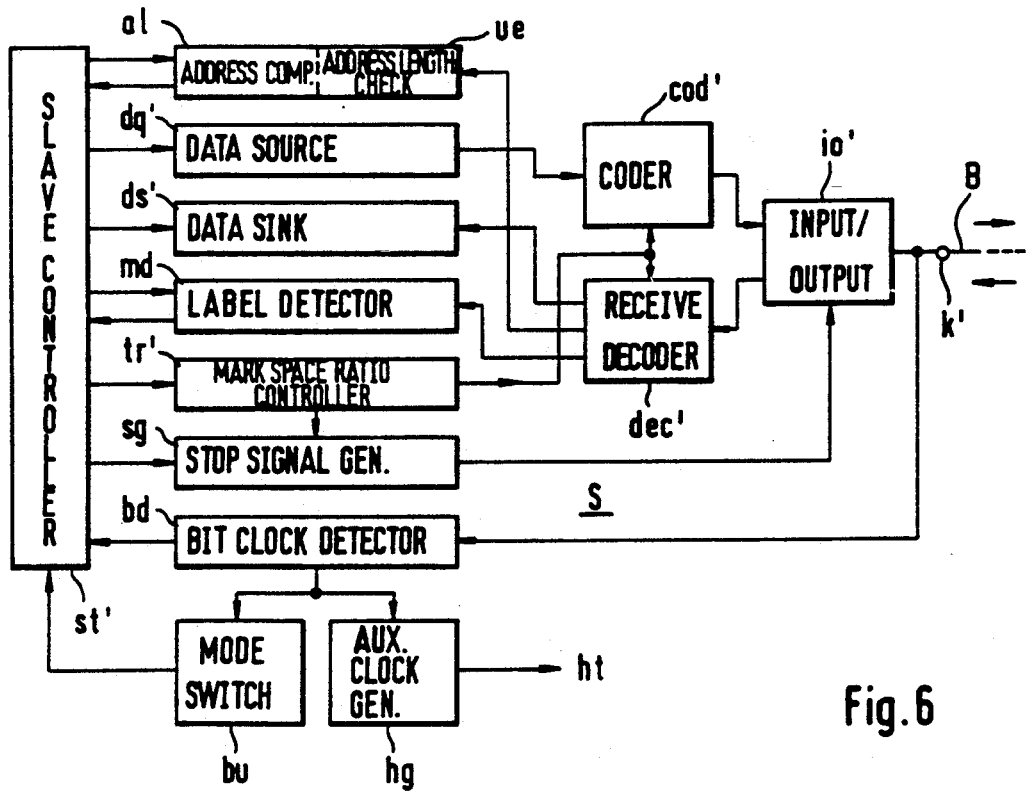
FIG. 6 is a block diagram of one embodiment of a slave module or unit according to this invention.

FIG. 6 is a block diagram of a slave unit S. The functional similarity with the master M should be apparent from a comparison of FIG. 5 and FIG. 6. The output terminal k' of the slave input/output stage or processor io' is connected to the single-wire bus B. The internal data output of the input/output stage is coupled to a decoder dec', and the internal data input is connected to the output of a coder cod', which is fed from a data source dq'. The output terminal of the decoder dec' is coupled to a data sink ds', an address comparator al with an address-length-checking device ue, and is also coupled to the input of a label detector md.

The windows for the different mark-space ratios in the coder cod' and the decoder dec, are controlled by a mark-space ratio controller tr' which operates as tr of FIG. 5. The latter also controls the mark-space ratios for the not-ready and cancel signals, which are formed in a stop-signal generator sg and are fed directly to the input/output stage io'. In the input/output stage io', the second logic state, i.e., "0", is forced on the respective synchronizing bit sb or inhibit bit bb (FIG. 4) when necessary.

The presence of a bit clock bt on the single-wire bus B during the wait state is detected by a bit-clock detector bd. When the bit clock is not present on the bus, the bit clock detector initiates a current-saving state via a mode switch bu which acts on the slave controller st'. Also coupled to the bit-clock detector bd is an auxiliary-clock generator hg which provides an auxiliary clock ht possessing an integral frequency ratio with respect to the bit-clock bt.

If the slave S unit is implemented using CMOS technology, from the internal clock is only inactivated when the circuit is to be deenergized.

The address comparator al, which operates with addresses of arbitrary length, includes an address-length-checking device ue. If the address sections ad (or the device addresses da) and the address lengths are not equal, no enable signal aj (FIG. 7) will be sent to the slave controller st'. Thus, any accidental correspondence in addresses of different length will not result in a data transfer.

Figure 7:
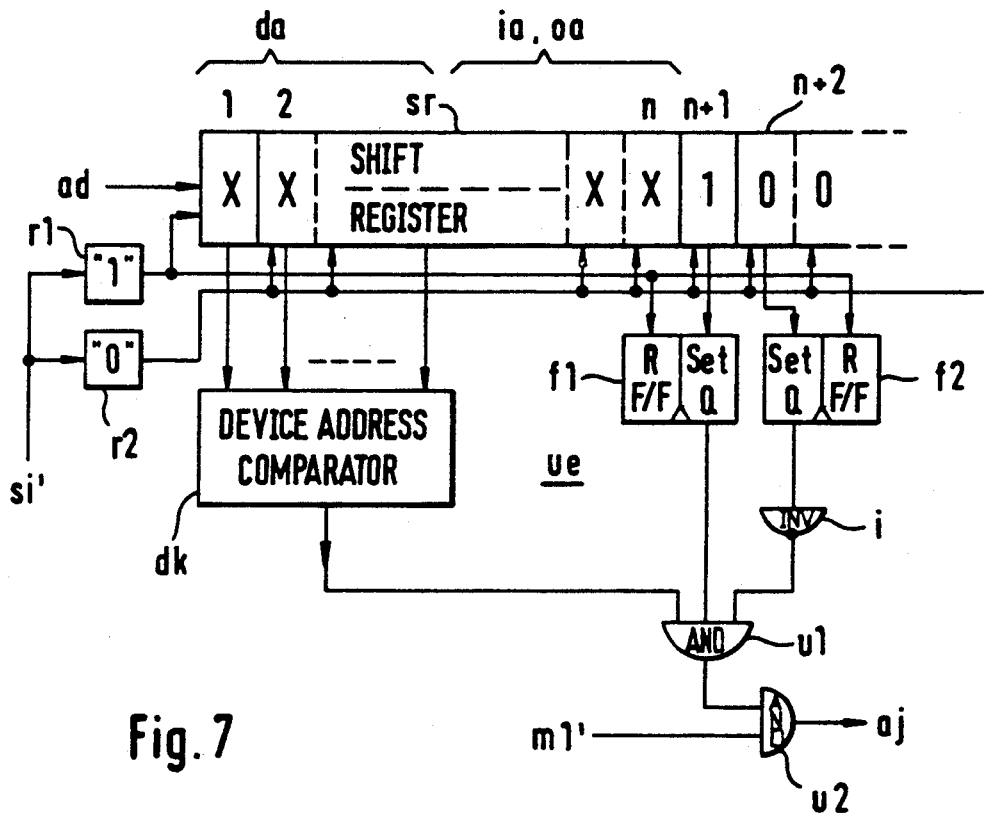
FIG. 7 is a block diagram of an address-length-checking device.

FIG. 7 is a block diagram of an address-length-checking device ue. A shift register sr stores the serially applied data of the address section ad. The shift register is part of a shift register necessary for use in the address comparator. The shift register sr contains at least $n+1$ stages for address-length-checking, where n is the number of bits of the address to be recognized. By means of a start signal si' derived from the start information si, all shift-register stages except the first are set to "0" at the beginning of the write-in operation. At this time the first shift-register stage is set to "1". The setting of the individual shift-register stages is implemented via the set and reset inputs or via the data inputs, to which either a "1" or a "0" is applied from first or second memory modules r1, r2. The setting of shift-registers via set or reset inputs by the data lines are well known.

The beginning of the address section ad initiates the serial writing of addresses into the shift-register stages. The process continues until the first label m1 is detected to terminate the shifting process. If the address lengths are equal, the logic "1" of the first shift-register stage which was initially set must have been shifted to shift-register stage $n+1$. The criterion for the correct address length is the check that a first "1" has arrived in shift-register stage $n+1$ and that this first "1" is still present.

In the embodiment of FIG. 7, the circuit for performing this check comprises first and second RS flip-flops f1, f2, two additional shift-register stages $n+1$ and $n+2$, an inverter i, and a first and a second AND gate u1, u2. Upon detection of the start signal si', the reset inputs R of the two RS flip-flops f1, f2 are operated at the beginning of the address length measurement interval. The set inputs Set of the RS flip-flops f1, f2 are connected to the outputs of shift-register stages $n+1$ and $n+2$, respectively. The Q output of the first RS flip-flop f1 is connected directly to one input of the first AND gate u1, and the Q output of the second RS flip-flop f2 is coupled to the second input of AND gate u1 through the inverter i. The third input of the AND gate u1 is connected to the output of a device-address comparator dk. The parallel input of the comparator dk is connected to the shift-register stages which store the device address da. The device-address comparator contains the device address to be recognized in the form of hardware or software information. Thus when the message format T contains the address of the slave, this address is compared to the stored address in comparator dk and a match specifies the slave or master selected.

The recognition of the correct address length results from the validity check of the following states:

1. The Q output of the first RS flip-flop f1 must be a logic "1", which means that a "1" was in shift-register stage $n+1$ at least once during the measurement interval.
2. The Q output of the second RS flip-flop f2 must be a logic "0", which means that a "1" has not been in shift-register stage $n+2$ during the measurement interval. Otherwise, the second RS flip-flop f2 would have been toggled. This would be detectable by a "1" at the Q output.
3. Finally, the output of the device-address comparator dk must indicate that a check exists between all bits in the area of the device address da and the stored bits.
4. The preceding checks 1 to 3 operate to provide the enable signal aj only if the first label m1 has signalled the end of the address section ad. The effectiveness of this check is contingent upon the first label m1: A signal m1' derived from this label is applied to one input of the second AND gate u2, and the output from the first AND gate u1 to the other input. The output of the AND gate u2 provides the desired enable signal aj which essentially verifies that this slave is selected and informs the controller.

The state of shift-register stage $n+1$ may also be checked other ways. For example, a check may be made to determine whether the first RS flip-flop f1 first changed state on the occurrence of the last bit clock pulse or earlier.

Figure 8:
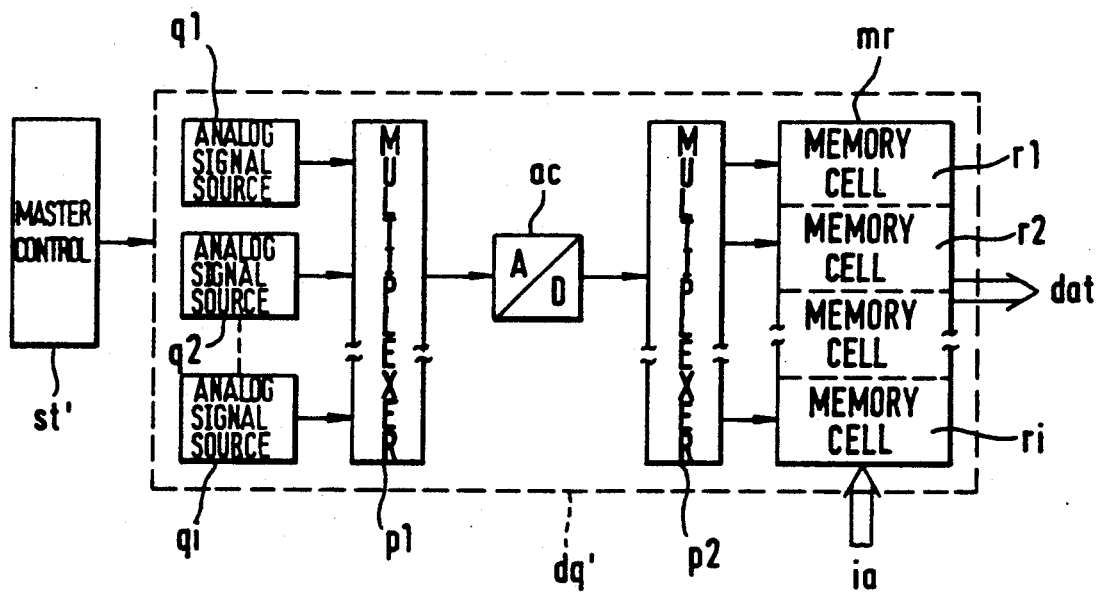
FIG. 8 is a block diagram of a multiple data source contained in a slave module and forming part of a sensor component.

FIG. 8 is a block diagram of a multiple data source which can operate as the data source dq, in a slave unit. The data source includes a plurality of analog-signal sources q1, q2, qi which are sampled in succession by a first multiplexer p1 and fed to an analog-to-digital (A/D) converter ac. The output of the A/D is applied to the input of a second multiplexer p2 which directs the data into memory cells r1, r2, ri of a memory device mr. Readout of the data from the individual memory cells is accomplished by selecting the respective cell by means of the internal address ia. If the data source dq includes only a single analog-signal source q1, the first and second multiplexers p1, p2 are unnecessary, and the memory device mr requires only a single cell r1. The above-described addressing via the internal address ia is also not necessary for a single analog source.

Figure 9:
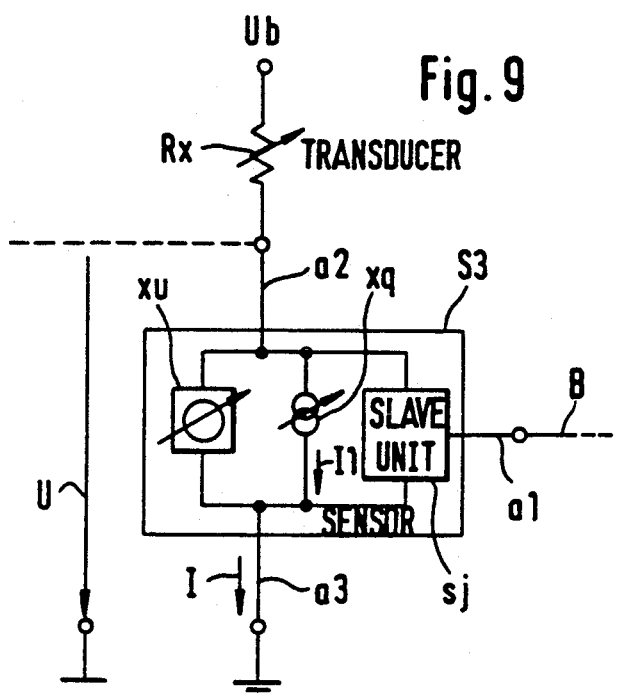
FIG. 9 is a schematic representation of a three-lead sensor component useful with this invention.

A particularly advantageous application of the master-slave data transmission system described and in which the slave units include a single or multiple analog-signal source as data sources dq', is for monitoring sensor components employed in a variety of measurement tasks. A plurality of similar or different sensor components can be interrogated via one single-wire bus B. This can be used for intrusion detection systems as fire and burglar alarm systems employing heat sensors, security sensors and so on. In addition, the necessary number of leads of the sensor components can be reduced to three as shown in FIG. 3 and FIG. 9. As seen in FIG. 3, the first lead a1 of sensor S3 serves to connect the sensor component to the single-wire bus B. The second and third leads a2, a3 serve to connect the component to the positive and negative supply terminals.

FIG. 9 shows schematically a three-lead sensor component S3 (FIG. 3) which is connected to an angle-ofrotation transducer Rx which operates as a variable resistor. The unknown resistance Rx can be determined by reading the voltage U between the second and third leads a2, a3 and the shunt current I as data via the single-wire bus B. From the values U, I and the known supply voltage Ub, the unknown resistance value Rx can be calculated by a master unit M with the aid of a conventional arithmetic unit connected to the data sink ds in the master M.

If the supply voltage Ub is unknown, the unknown resistance value of the position transducer Rx can be determined from two different measurements, with either the voltage U or the shunt current I appropriately switched by operating the sensor S3 in the appropriate mode.

The absolute resistance value of the position transducer Rx is not needed, but only the relative measurement is sufficient. Thus if in the sensor S3 a current I1 from a variable current source is provided to produce in fixed, but predetermined steps or is simply doubled, the measured voltage values U can be used to determine the relative resistance change of the position transducer Rx. This value can then be determined without knowing the actual value of the shunt current I. This information can be used to reposition an object in a desired position or to readjust a predetermined angle of rotation, and so on.

In addition to the above-described functional modules, the sensor of FIG. 9 contains a current source switching device xq and/or a voltage source switching device xu. The analog-signal source is a device for measuring the voltage between the second and third leads a2, a3, which is not shown in FIG. 9.

Figure 10:
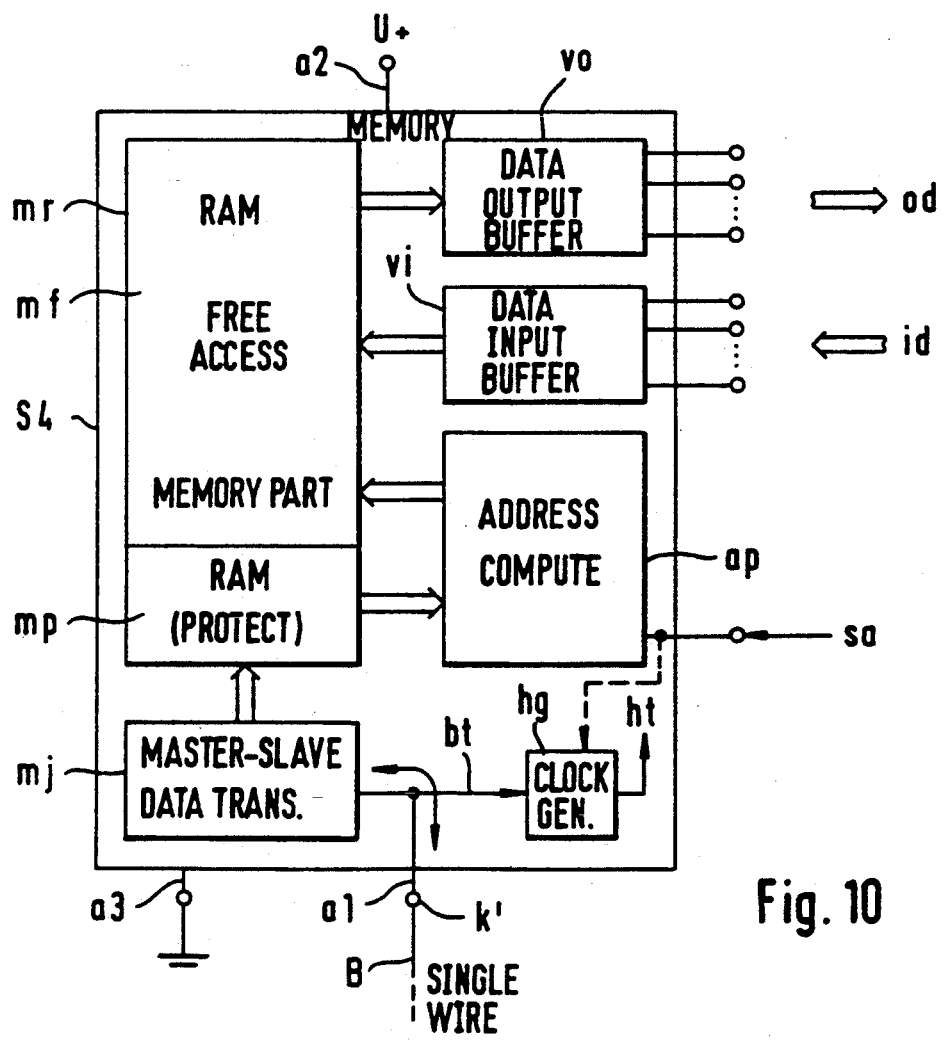
FIG. 10 is a block diagram of a first memory component.

FIG. 10 shows another application of the master-slave data transmission system using a single-wire bus B. There is shown a slave unit S4 with "built-in intelligence". A protected or designated area mp of a memory device mr contains an address computation program which is written into this memory area via a master-slave data transmission system mj in accordance with the invention. The output terminal k' of the slave is the first lead a1 of the memory component, which lead is connected to the single-wire bus B. In a programming phase, the memory component S4 receives from the single-wire bus B the messages T, which contain the individual steps of the address computation program. These are, as a rule, simple, cyclic computation programs, with the individual addresses being determined in an address-computing device ap. The freely accessible area mf of the memory device mr' is connected to a data output stage or buffer vo and a data input stage or buffer vi. For the output and input data od, id, at least one respective set of leads is available, via which parallel data transfer is possible.

Internal synchronization is established by means of an auxiliary clock ht provided by an auxiliary clock generator hg, which is locked to either the bit clock bt or a read signal sa. Also synchronized with the external read signal sa is the data cycle, whose period is an integral multiple of the period of the auxiliary clock ht or the bit clock bt. Synchronism between the different clocks is achieved in the conventional manner by means of a phase-locked loop in the auxiliary clock generator hg or otherwise.

The memory component S4 with built-in address computation is particularly advantageous where the read and write rates and the necessary number of leads are very high. Such a memory is needed, for example, in video-signal-processing applications for storing frames of color-television signals.

The cost of packaging multilead memory components is very high. As a rule, the length of the leads increases with their number. This increases the mutual coupling between the leads, whereby the data rate is limited. The invention remedies this problem, since such high-speed components require no address leads at all.

Figure 11:
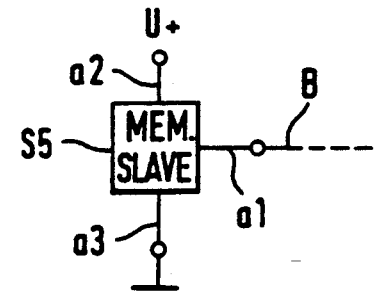
FIG. 11 is a block diagram of a three-lead memory component used in this invention.

Another embodiment of a memory component is shown in FIG. 11. This memory component, S5, is a three-lead component whose first terminal a1 is connected to the single-wire bus B, while the second and third leads are connected to the positive and negative supply-voltage terminals, respectively. Such three-lead memory components S5 can be used where a low data transfer rate is sufficient. The entire data transfer can then occur serially via the single-wire bus B. The internal address section ia in the message T can operate to select the respective internal address in the memory component S5. The information or data now contain alignment or adjustment information for a color or other type of picture tube. If the stored data is not changed during operation, the memory device can be a read-only memory. An advantage of such three-lead components is that low-cost three-lead transistor cases can be used. If the message T is transmitted at a slow data rate on the single-wire bus B the master unit M can be implemented hg employing a processing program which is loaded into a commercially available microprocessor.

I claim:

1. In a master-slave data transmission system including at least one master unit operative to send data to or read data from at least one slave unit via an input/output stage, with the data transfer taking place via a single-wire bus said system providing a message format for transmission and reception via said bus, said message format including:
   an address section defining at least an address of a slave unit;
   a data portion including transmitted or read data; and
   a start and an end information signal section for defining the start and end of said message format, the combination therewith, comprising:
   at least one master unit and at least one slave unit connected to said single-wire bus via respective input/output stages contained in said master and slave units with said master unit having an address generating section for providing an address of a length which is arbitrarily predeterminable from message to message and where the end of said address section is defined by a first label;
   with the respective slave unit to be addressed including an address-length-checking device responsive to said transmitted message to decode said address to determine the selection of said slave, wherein said address-length-checking device includes:
   a shift register having at least n+1 stages in which the received address section is adapted to be stored, where said first shift-register stage is set to "1" at the start of message and the other shift-register stages are set to "0";
   means for detecting said first label to initiate an address-length check; and
   an evaluating circuit coupled to said shift register for checking whether an "1" arrived in shift-register stage n+1 since said start time and whether said "one" is still present in said register;

with said transmitted message having a data part, the length of which is arbitrarily predeterminable from message to message;

a bit clock generator located in said master unit for generating a clock which clock is transmitted before or after a transmission;

with said transmitted message having a start information signal at the start of said message, detecting means located in said master unit and responsive to said start of message signal present on said bus to prevent all master units not generating said message to cease any message generation for the duration of the message format on said bus; and an output error detector located in said master unit and operative to prevent contention between two or more master units during a transmission.

2. A data transmission system according to claim 1, further including:

means in said master unit for inserting a synchronizing bit in said message format after said first label;

means in said slave unit responsive to said synchronizing bit to maintain a first logic state ("1") of said synchronizing bit to indicate to said master that the processing of said message is to continue by said slave unit;

means in said slave unit for providing a not-ready signal by changing the synchronizing bit to a second logic state ("0") to indicate to said master that said slave unit is not ready to process the message; and means located in said master unit and operative to detect said not-ready signal to enable said master unit to relinquish said bus by sending an end information signal.

3. A data transmission system according to claim 1, whereby said address generating section provides an address part including a device address, an internal address and an operation address.

4. A data transmission system according to claim 1, wherein the data part of said message contains program instruction adapted to be written into predetermined memory locations specified by said respective internal address.

5. A data transmission system according to claim 1, further including:

means for inserting between the data part and the end information of said message format in sequence, a second label, a variable-length test section and a third label followed by an inhibit bit; and means included in said slave unit and responsive to the detection of an error to change the state of said inhibit bit, and means located in said master unit responsive to said changed inhibit bit to provide signal which cancels said message being transmitted by said master unit.

6. A data transmission system according to claim 5, including:

means located in said master unit for providing logic states of bits in said message defined by a first or second temporal ratio between a first state and a second state of said single-wire bus, with the transition from the second state to the first defining the beginning of a respective bit clock period, and to provide said first, second, and third labels with said bits of said end information defined by a third temporal ratio between said first and second states.

7. A data transmission system according to claim 6, further comprising:

means in said master unit for providing a synchronizing bit and an inhibit bit which each have said first logic state or a second logic state defined by said first or second temporal ratio between the first and second states;

wherein the first logic state is adapted to be decoded to define an undisturbed processing of the message by a slave unit; and said second logic state is adapted to be decoded to define an interruption of the processing of said message.

8. A data transmission system according to claim 8, comprising:

means for operating said single-wire bus and said input/output stages of said connected masters and slaves to provide a "wired OR" function, with one of the states of the single-wire bus capable of being changed by at least a master unit; and means responsive to said second temporal ratio wherein the duration of said changed state is longer than at the duration of said first temporal ratio.

9. The data transmission system according to claim 1, wherein said slave unit includes a sensor means including at least one analog-signal source, and including an analog-to-digital converter for converting said analog value to a digital value, a memory for storing said digital value and means located in said master unit for recording said stored value.

10. The data transmission system according to claim 9, further including:

at least two analog-signal sources located in a slave unit, a first multiplexer coupled to said sources at their output, an analog-to-digital converter connected to said output of said first multiplexer to provide a digital output of said multiplexed sources, with said digital output of said analog-to-digital converter stored in a memory cell for each analog-signal source by means of a second multiplexer synchronized with said first multiplexer.

11. A data transmission system according to claim 9, further comprising a sensor operative as a slave unit and having a minimum of three electric leads, with said first lead connected to said single-wire bus, with the second lead connected to a positive supply voltage, and with the third lead adapted to be connected to a negative supply voltage.

12. The system according to claim 11, including means located in said master unit and operative to measure the voltage between the second and third leads via said single-wire bus.

13. The system as claimed in claim 12, further comprising a sensor means including a current source, switching means operative to vary the current flow I between said second and third leads in at least two defined steps, and wherein said sensor means further includes a voltage source switching device operative to vary the voltage between said second and third leads in at least two defined steps.

14. A memory component for use in the data transmission system according to claim 1, including memory means operative as a slave unit having a data source means comprising a monolithic integrated memory device having a plurality of memory cells for data storage each of which can be selectively accessed for a read or write mode and means for switching from a read mode to a write mode according to an operation address in said message format.

15. The memory component according to claim 14, wherein said slave unit includes an address-computing means for providing predetermined address cycles, wherein said address cycle contains memory operating instructions.

16. The memory component according to claim 15, wherein
said address-computing means and said memory means are fabricated on a common monolithic integrated circuit;
a program for said address-computing means is stored as an address computation program in a protected area of said memory means; and wherein said address computation program is written into said memory means via said single-wire bus.

17. The memory component according to claim 14, having a minimum of three electric leads, with a first lead adapted to be connected to said single-wire bus, and with a second lead adapted to be connected to a positive supply voltage, and with a third lead adapted to be connected to a negative supply voltage.

18. The memory component according to claim 15, wherein said memory means has a terminal which is connected to said single-wire bus operative to apply said address computation program during a programming phase, to enable internal computation of an address by said memory means in the normal operating phase and which is synchronized by an external read signal on said bus where all bits of a data word are available in parallel via data leads.

19. In a master-slave data transmission system including at least one master unit operative to send data to or read data from at least one slave unit via an input/output stage, with the data transfer taking place via a single-wire bus said system providing a message format for transmission and reception via said bus, said message format including:
an address section defining at least an address of a slave unit;
a data portion including transmitted or read data; and
a start and an end information signal section for defining the start and end of said message format, the combination therewith, comprising:
at least one master unit and at least one slave unit connected to said single-wire bus via respective input/output stages contained in said master and slave units with said master unit having an address generating section for providing an address of a length which is arbitrarily predeterminable from message to message and where the end of said address section is defined by a first label;
with the respective slave unit to be addressed including an address-length-checking device responsive to said transmitted message to decode said address to determine the selection of said slave;
with said transmitted message having a data part, the length of which is arbitrarily predeterminable from message to message;
a bit clock generator located in said master unit for generating a clock which clock is transmitted before or after a transmission;
with said transmitted message having a start information signal at the start of said message, detecting means located in said master unit and responsive to said start of message signal present on said bus to prevent all master units not generating said message to cease any message generation for the duration of the message format on said bus;
an output error detector located in said master unit and operative to prevent contention between two or more master units during a transmission;
means located in master unit and operative to cause said bit clock generator to transmit said bit clock on said single-wire bus for a given interval before or after said message and for suppressing said bit clock on said single-wire bus at other intervals; and
means located in said slave unit responsive to said transmitted bit clock to detect said clock to provide a signal to activate all slave units connected to said bus and including means responsive to said suppressed bit clock to place said slave into a power saving mode.

* * * * *